United States Patent
Hosota et al.

(10) Patent No.: US 7,559,708 B2
(45) Date of Patent: Jul. 14, 2009

(54) OPTICAL UNIT AND IMAGING APPARATUS

(75) Inventors: Hiroyoshi Hosota, Toyokawa (JP); Hirotoshi Konishi, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 378 days.

(21) Appl. No.: 11/390,890

(22) Filed: Mar. 28, 2006

(65) Prior Publication Data

US 2006/0222356 A1  Oct. 5, 2006

(30) Foreign Application Priority Data

Mar. 29, 2005  (JP) ............................. 2005-093572

(51) Int. Cl.
  *G03B 9/02* (2006.01)
  *G03B 9/08* (2006.01)

(52) U.S. Cl. ........................................ 396/505; 396/452

(58) Field of Classification Search ................. 396/73, 396/75, 89, 452, 463, 467, 468, 489, 493, 396/505, 529; 348/345, 363
See application file for complete search history.

(56) References Cited

U.S. PATENT DOCUMENTS 5,416,558 A * 5/1995 Katayama et al. ............. 396/52
2005/0146637 A1 7/2005 Kawauchi

FOREIGN PATENT DOCUMENTS

JP  2004-264712  9/2004

* cited by examiner

*Primary Examiner*—Rodney E Fuller
(74) *Attorney, Agent, or Firm*—Brinks Hofer Gilson & Lione

(57) ABSTRACT

Provided is a compact thin type optical unit provided also with a housing 2 having an mounting surface 31 for mounting an imaging device 18 on, an optical system driving device 5 for driving the optical system 3, a light quantity control member 16 for controlling a light quantity projecting on the imaging device 18 and a light quantity control driving device 6 for driving the light quantity control member 16, and the optical system driving device 5, wherein the light quantity control driving device 6 are arranged outside a same side of the mounting surface 31 so as to overlap each other in a direction perpendicular to an optical axis X of the optical system 3.

21 Claims, 2 Drawing Sheets

OPTICAL UNIT AND IMAGING APPARATUS

This application is based on applications No. 2005-093572 filed in Japan, the contents of which are hereby incorporated by reference.

BACKGROUND OF THE INVENTION

The present invention relates to an optical unit and an imaging apparatus which project an image of a subject on an imaging device.

Generally, in an imaging apparatus projecting an image of a subject on an imaging device, a movable optical system (e.g. lens group) is placed in front of (on the subject side of) an imaging device that has a rectangular imaging surface, and a light quantity control member such as a shutter, an aperture diaphragm or the like is provided within or in front of the movable optical system.

A light quantity control driving device as a motor and so on for driving the shutter or the aperture diaphragm and an optical system driving device for moving the movable optical system in 6 the optical axis direction are arranged at an interval of a large angle around the optical axis so as not to interfere with each other (e.g. US2005/0146637)

However, the light quantity control driving device and the optical system driving device are obstructive factors in further reducing the projection area in the optical axis direction of the optical unit. Although the projection area in the optical axis direction is reduced when the light quantity control driving device and the optical system driving device are arranged in a line in the optical axis direction, the optical unit is elongated in the optical axis direction, and the need for reducing the thickness cannot be satisfied.

SUMMARY OF THE INVENTION

An object of the present invention is to provide a compact thin type imaging apparatus and of which a optical unit provided also with a movable optical system and a light quantity control member.

In order to achieve the objects of the present invention, there is provided an optical unit for projecting an image of a subject on an imaging device comprising a housing having an mounting surface for mounting an imaging device on, a movable optical system, an optical system driving device for driving the optical system, a light quantity control member for controlling a light quantity projecting on the imaging device and a light quantity control driving device for driving the light quantity control member, wherein the optical system driving device and the light quantity control driving device are arranged outside a same side of the mounting surface so as to overlap each other in a direction perpendicular to an optical axis of the optical system.

According to the construction, since the optical system driving device and the light quantity control driving device are not arranged in a line in the optical axis direction, the thickness in the optical axis direction of the imaging apparatus is small. Moreover, since the optical system driving device and the light quantity control driving device are arranged outside the same side of the mounting surface of a housing that houses both of the units has a high space efficiency, and the projection area in the optical axis direction of the imaging apparatus is small.

Moreover, the optical system driving device and the light quantity control driving device may be adjacently arranged in the optical unit of the present invention.

According to the construction, since the optical system driving device and the light quantity control driving device are adjacently arranged, the space efficiency of the housing becomes higher.

Moreover, in the optical unit of the present invention, the optical system driving device may protrudes with reference to the mounting surface in the direction opposite to the subject.

According to the construction, since the optical system driving device and the imaging device are not arranged in a line in the optical axis direction, the thickness in the optical axis direction of the imaging apparatus becomes smaller.

Moreover, in the optical unit of the present invention, the optical system driving device may comprise an electro-mechanical transducer which extends or contracts when a electric voltage is applied, and a moving member support member supporting a moving member which holds the optical system and engages with the electro-mechanical transducer so that the moving member support member is displaced with the electro-mechanical transducer. Furthermore, the moving member may comprise a moving member body, a suppressing member for holding the moving member support member between the moving member body member and the suppressing member, and a biasing member for biasing the suppressing member toward the moving member support member.

According to the construction, the optical unit can be made compact with a small frictional drive unit.

Moreover, the light quantity controller may be mounted to the moving member in the optical unit of the present invention.

According to the construction, the center of gravity of the components moved by the optical system driving device is located near the moving member support member, and the torsion of the moving member is reduced. Therefore, the drive by the optical system driving device becomes smooth.

Moreover, the light quantity control member may comprise a shutter blade and the light quantity control driving device may comprise a solenoid in the optical unit of the present invention.

Moreover, according to the present invention, there is also provided an imaging apparatus comprising a imaging device, a movable optical system, an optical system driving device for driving the optical system, a light quantity control member for controlling a light quantity projecting on the imaging device and a light quantity control driving device for driving the light quantity control member, wherein the optical system driving device and the light quantity control driving device are arranged outside a same side of an imaging surface of the imaging device so as to overlap each other in a direction perpendicular to an optical axis of the optical system.

As described above, since the optical system driving device and the light quantity control driving device are arranged so as to overlap each other in the direction perpendicular to the optical axis, the optical unit or imaging apparatus of the present invention has a small thickness in the optical axis direction. Moreover, both the optical system driving device and the light quantity control driving device are arranged on the same side with reference to the imaging surface of the imaging device. Therefore, both of the devices can be housed with high space efficiency, and the projection area in the optical axis direction is small. Therefore, the optical unit or imaging apparatus of the present invention is a compact and thin type.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
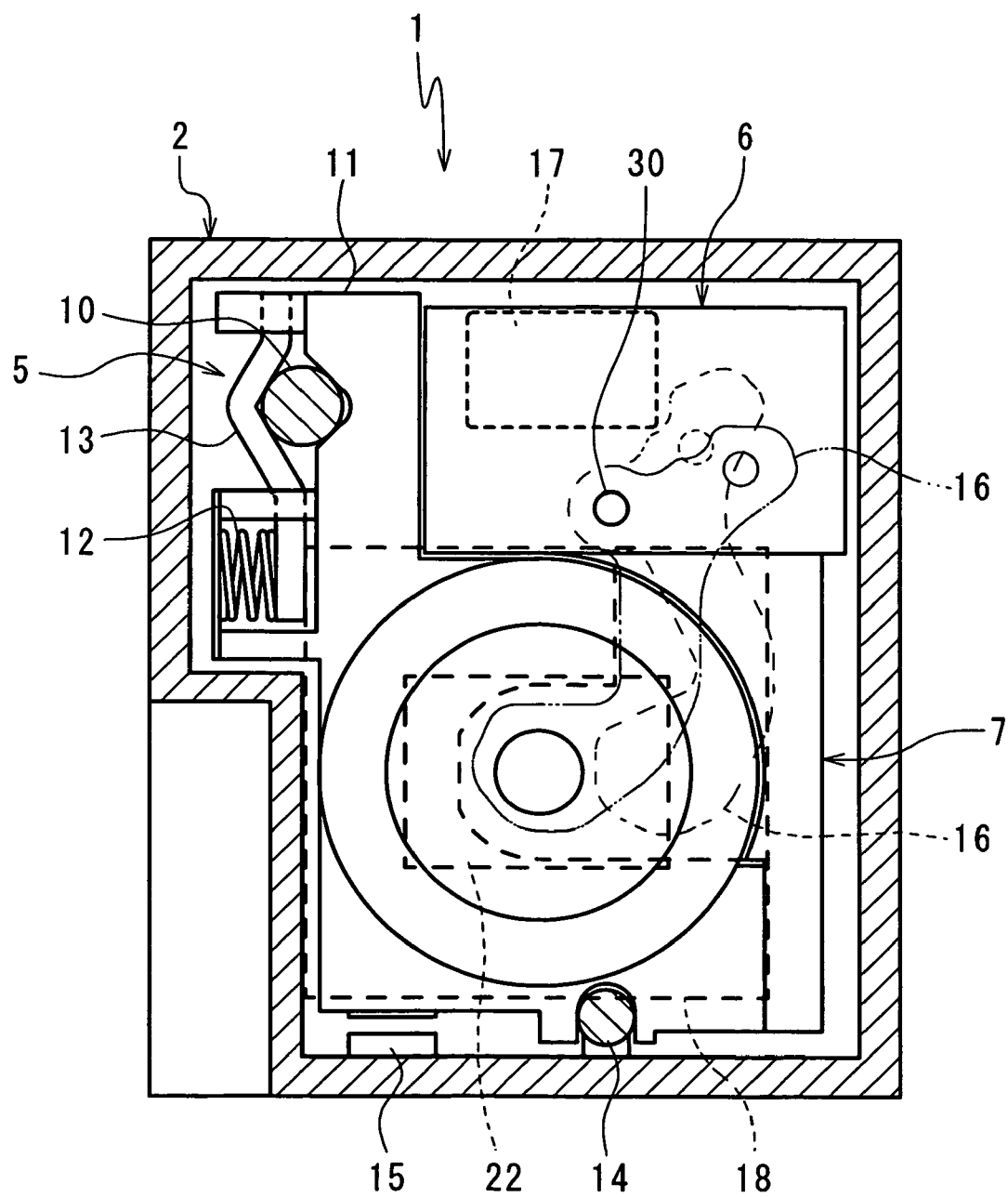
FIG. 1 is a front view of the imaging apparatus of the embodiment of the present invention.
Figure 2:
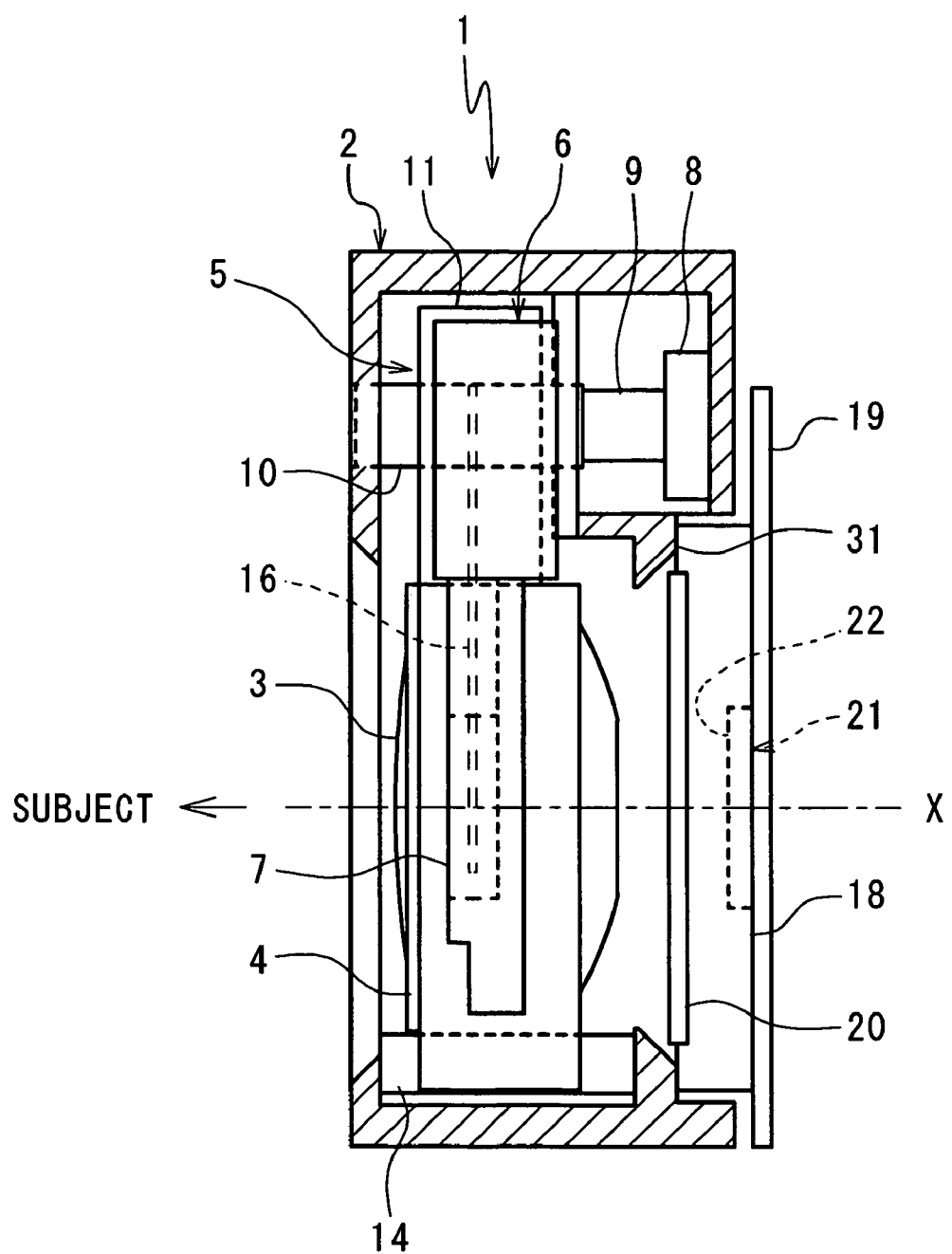
FIG. 2 is a side view of the imaging apparatus of FIG. 1.

Referring to FIGS. 1 and 2, a description is made below on an imaging apparatus, according to an embodiment of the present invention.

FIG. 1 shows a state in which the imaging apparatus of the first embodiment of the present invention is viewed from the direction of the subject (front), and FIG. 2 shows a state in which the imaging apparatus is viewed from a side. The imaging apparatus comprises an imaging device package (imaging device) 18 and an optical unit 1 for projecting an image of a subject on the imaging device 18. The optical unit 1 has a lens frame 4 supporting a lens group (optical system) 3 and supported by a optical system driving device 5 in a housing 2. A shutter unit 7 and a shutter driving device (light quantity control driving device) 6 are fixed to the lens frame 4. The optical system driving device 5 and the shutter driving device 6 are adjacently arranged so as to overlap each other in a view from a direction perpendicular to the optical axis X of the imaging apparatus.

The optical system driving device 5 has a piezoelectric element (electro-mechanical transducer) 9 whose one end is mounted on the housing 2 via a fixation member 8, and a columnar drive shaft (moving member support member) 10 attached to the other end of the piezoelectric element 9. The drive shaft 10 is held between a moving member 11 provided protruding from the lens frame 4 and a hold member 13 urged by a compression spring 12. The piezoelectric element 9 extends or contracts when a electric voltage is applied, and the drive shaft 10 is vibrated in the direction of the optical axis X by the extension and contraction of the piezoelectric element 9, then a slide between the drive shaft 10 and the moving member 11 occurs, therefore the moving member 11 slides in either direction along to the drive shaft 10. The lens frame 4 is brought in slidable engagement also with a suspension shaft 14 provided in the housing 2 on the side opposite from the moving member 11. The position in the direction of the optical axis X of the lens frame 4 is detected by a position sensor 15 provided on the housing 2.

The shutter unit 7 has a shutter blade (light quantity control member) 16 provided pivotably about a shaft 30, and the shutter driving device 6 has a solenoid 17 that makes a shutter blade 16 pivot in a plane perpendicular to the optical axis X of the optical unit 1. When the solenoid is turned off, the shutter blade 16 moves to the position as indicated with the solid line in FIG. 1 so as to shut out the light projecting on the imaging device package 18. But when the solenoid is turned on, the shutter blade 16 moves to the position as indicated with the dashed line in FIG. 1 therefore the light from the subject passes through the lens 3 and enters an imaging device package 18. The imaging device package 18 is mounted on the mounting surface 31 of the housing 2, and a board 19 is fixed to the opposite surface of the imaging device package 18 from the surface attached to the housing 2. The light which comes from the subject and is made incident through a cover glass 20 and formed as an image on the imaging surface 22 of the sensor section 21 that serves as a functioning section, is converted into an electrical signal.

The imaging device package 18 is arranged so as to overlap the fixation member 8 of the optical system driving device 5 in the direction perpendicular to the optical axis X. That means the fixation member 8 of the optical system driving device 5 is mounted so as to protrude with reference to the mounting surface 31 in the direction opposite to the subject. Moreover, the optical system driving device 5 and the shutter driving device 6 are arranged in a line outside the long side of the rectangular imaging surface 22 of the imaging device package 18 and mounting surface 31.

The operation of the imaging apparatus having the construction is described next.

Since both the optical system driving device 5 and the shutter driving device 6 are arranged outside the same long side of the imaging surface 22 in the imaging apparatus, an increase in the height (dimension in the direction of the short side of the imaging surface) and the width (dimension in the direction of the long side of the imaging surface) of the imaging apparatus are suppressed to a minimum. Moreover, since the optical system driving device 5 and the shutter driving device 6 are adjacently arranged, the projection area of the whole imaging apparatus is small when it is viewed from the direction of the optical axis X since the space efficiency is high with no useless space in the housing 2 that houses both the units.

Moreover, by virtue of the mutually overlapping arrangement of the optical system driving device 5 and the shutter driving device 6 and the mutually overlapping arrangement of the optical system driving device 5 and the imaging device package 18 in the view from the direction perpendicular to the optical axis X, the thickness in the direction of the optical axis X of the imaging apparatus depends only on the dimension of the optical system driving device 5 that is the longest in the direction of the optical axis X. Therefore, the imaging apparatus, of which the thickness in the direction of the optical axis X is slightly greater than the length of the optical system driving device 5, is a thin type.

Furthermore, since the shutter driving device 6 is provided adjacent to the optical system driving device 5 in the imaging apparatus, the center of gravity of the members moved by the optical system driving device 5, i.e., the center of gravity of the integrated mass of the lens frame 4, the shutter unit 7 and the shutter driving device 6 is located nearer to the optical system driving device 5 than the center (optical axis X) of the lens 3. Therefore, a torsion generated in the moving member 11 as a reaction of the vibration of the drive shaft 10 is reduced, and the moving member 11 can smoothly move in the direction of the optical axis X along the drive shaft 10 and the suspension shaft 14.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical unit for projecting an image of a subject on an imaging device, the imaging device comprising an imaging surface and converts an image formed on the imaging surface into an electrical signal, the optical unit comprising:

a housing having a mounting surface for mounting an imaging device thereon, the mounting surface defines an opening that extends over an area having a rectangular shape;

a movable optical system which projects the image of the subject onto the imaging device;

an optical system driving device for driving the optical system;

a light quantity control member for controlling a light quantity projecting on the imaging device; and a light quantity control driving device for driving the light quantity control member, wherein the optical system driving device and the light quantity control driving device are arranged outside a common side of the rectangular shape of the area, relative to an optical axis of the optical system, so as to overlap each other in a direction perpendicular to the optical axis of the optical system.

2. The optical unit as claimed in claim 1, wherein the optical system driving device and the light quantity control driving device are adjacently arranged.

3. The optical unit as claimed in claim 1, wherein the optical system driving device protrudes with reference to the mounting surface in direction opposite to the subject.

4. The optical unit as claimed in claim 1, wherein the optical system driving device comprises:

an electro-mechanical transducer which extends or contracts when a electric voltage is applied; and a moving member support member supporting a moving member which holds the optical system and engages with the electro-mechanical transducer so that the moving member support member is displaced with the electro-mechanical transducer.

5. The optical unit as claimed in claim 4, wherein the moving member comprises:

a moving member body;

a suppressing member for holding the moving member support member between the moving member body member and the suppressing member; and a biasing member for biasing the suppressing member toward the moving member support member.

6. The optical unit as claimed in claim 4, wherein the light quantity control member and the light quantity control driving device are held by the moving member.

7. The optical unit as claimed in claim 4, wherein the optical system driving device is mounted on the housing.

8. The optical unit as claimed in claim 4, wherein the light quantity control member comprises a shutter blade.

9. The optical unit as claimed in claim 4, wherein the light quantity control driving device comprises a solenoid.

10. The optical unit as claimed in claim 1, wherein the optical axis intersects the area.

11. An optical unit for projecting an image of a subject on an imaging device, which comprises an imaging surface and converts an image formed on the imaging surface into an electrical signal, the optical unit comprising:

a housing having a mounting surface for mounting an imaging device thereon, the mounting surface defines an opening that extends over an area having a rectangular shape;

an optical system which projects the image of the subject onto the imaging device;

an electro-mechanical transducer which extends or contracts when a electric voltage is applied;

a moving member holding the optical system;

a moving member support member which supports the moving member and engages with the electro-mechanical transducer so that the moving member support member is displaced with the electro-mechanical transducer;

a light quantity control member for controlling a light quantity projecting on the imaging device; and a light quantity control driving device for driving the light quantity control member, wherein the moving member support member and the light quantity control driving device are arranged outside a common side of the rectangular shape of the area, relative to an optical axis of the optical system, so as to overlap each other in a direction perpendicular to the optical axis of the optical system.

12. The optical unit as claimed in claim 11, wherein the moving member support member and the light quantity control driving device are adjacently arranged.

13. The optical unit as claimed in claim 11, wherein the moving member comprises:

a moving member body;

a suppressing member for holding the moving member support member between the moving member body and the suppressing member; and a biasing member for biasing the suppressing member toward the moving member support member.

14. The optical unit as claimed in claim 11, wherein the light quantity control member and the light quantity control driving device are held by the moving member.

15. The optical unit as claimed in claim 11, wherein the optical axis intersects the area.

16. An imaging apparatus comprising:

an imaging device, which comprises an imaging surface which has a rectangular shape and converts an image formed on the imaging surface into an electrical signal;

a movable optical system;

an optical system driving device for driving the optical system;

a light quantity control member for controlling a light quantity projecting on the imaging device; and a light quantity control driving device for driving the light quantity control member, wherein the optical system driving device and the light quantity control driving device are arranged outside a common side of the rectangular shape of the imaging surface of the imaging device, relative to an optical axis of the optical system, so as to overlap each other in a direction perpendicular to the optical axis of the optical system.

17. The imaging apparatus as claimed in claim 16, wherein the optical system driving device and the light quantity control driving device are adjacently arranged.

18. The imaging apparatus as claimed in claim 16, wherein the optical drive device overlaps the imaging device in the direction perpendicular to the optical axis of the optical system.

19. The imaging apparatus as claimed in claim 16, wherein the optical system driving device comprises:

an electro-mechanical transducer which extends or contracts when a electric voltage is applied; and a moving member support member which supports a moving member holding the optical system and engages with the electro-mechanical transducer so that the moving member support member is displaced with the electro-mechanical transducer.

20. The imaging apparatus as claimed in claim 19, wherein the light quantity control member and the light quantity control driving device are held by the moving member.

21. The imaging apparatus as claimed in claim 16, wherein the optical axis intersects the imaging surface.

* * * * *

UNITED STATES PATENT AND TRADEMARK OFFICE
CERTIFICATE OF CORRECTION

PATENT NO. : 7,559,708 B2  Page 1 of 1
APPLICATION NO. : 11/390890
DATED : July 14, 2009
INVENTOR(S) : Hiroyoshi Hosota et al.

It is certified that error appears in the above-identified patent and that said Letters Patent is hereby corrected as shown below:

In column 5, claim 3, line 17, after "mounting surface in" insert --a--.

Signed and Sealed this

Tenth Day of August, 2010

David J. Kappos
*Director of the United States Patent and Trademark Office*